(12) United States Patent
Heineke et al.

(10) Patent No.: US 12,123,446 B2
(45) Date of Patent: Oct. 22, 2024

(54) ANCHOR POINT

(71) Applicant: SFS Group International AG, St. Gallen (CH)

(72) Inventors: Kai Heineke, Teinach/Zavelstein (DE); Philipp Gentner, Weinsberg (DE)

(73) Assignee: SFS Group International AG, St. Gallen (CH)

( * ) Notice: Subject to any disclaimer, the term of this patent is extended or adjusted under 35 U.S.C. 154(b) by 78 days.

(21) Appl. No.: 17/769,804

(22) PCT Filed: Oct. 16, 2020

(86) PCT No.: PCT/EP2020/079245
§ 371 (c)(1),
(2) Date: Apr. 18, 2022

(87) PCT Pub. No.: WO2021/074400
PCT Pub. Date: Apr. 22, 2021

(65) Prior Publication Data
US 2022/0373007 A1     Nov. 24, 2022

(30) Foreign Application Priority Data

Oct. 18, 2019 (EP) ..................................... 19204030

(51) Int. Cl.
*F16B 2/22*      (2006.01)
*F16B 5/06*      (2006.01)

(52) U.S. Cl.
CPC .............. *F16B 2/22* (2013.01); *F16B 5/0685* (2013.01)

(58) Field of Classification Search
CPC ...... F16B 2/22; F16B 5/0685; F16B 13/0833; F16B 13/04; B64D 9/003
See application file for complete search history.

(56) References Cited

U.S. PATENT DOCUMENTS 3,213,189 A * 10/1965 Mitchell .................. F16B 2/22
                                                       174/138 R
3,275,284 A * 9/1966 Gary ..................... B61D 45/001
                                                       410/55

(Continued)

FOREIGN PATENT DOCUMENTS

DE          2538928 A * 3/1977 .............. F16B 13/04
DE          2706993 A * 8/1978 .............. F16B 13/04

(Continued)

*Primary Examiner* — Eret C McNichols
(74) *Attorney, Agent, or Firm* — Volpe Koenig

(57) ABSTRACT

An anchor point (10) for a fastening element (30), such as a cable tie, includes a substantially flat anchor plate (12) and a resilient element (14) connected thereto, which in turn has at least two locking tongues (16, 17). The anchor plate has a substantially circular disc shape. The resilient element is preferably designed as a plastic loop in the shape of an omega and exerts its resilient action primarily in a direction perpendicular to the plane of the anchor plate. Via an opening in the anchor plate a fastening element/cable tie can be passed through the anchor plate and is deflected by the locking tongues or the resilient element so that it passes through a second opening again to the surface. By pulling on the cable tie, the locking tongues are spread apart by compression of the resilient element and are fixed in or behind the opening of a surface.

14 Claims, 3 Drawing Sheets

(56) References Cited

U.S. PATENT DOCUMENTS

| | | | | |
|---|---|---|---|---|
| 3,343,441 A | * | 9/1967 | Buren, Jr. | F16B 37/043 411/37 |
| 3,838,802 A | * | 10/1974 | Grycel, III | F16B 21/04 224/309 |
| 3,960,091 A | * | 6/1976 | Ehlert | B60P 7/0807 410/101 |
| 5,160,812 A | * | 11/1992 | Takahashi | F16L 3/08 174/72 A |
| 5,387,065 A | * | 2/1995 | Sullivan | F16B 19/1081 411/48 |
| 5,505,411 A | | 4/1996 | Heaton et al. | |
| 6,142,718 A | * | 11/2000 | Kroll | B60P 7/0807 410/101 |
| 6,273,656 B1 | | 8/2001 | Cleland et al. | |
| 6,764,259 B1 | * | 7/2004 | Preta | B60P 7/0807 410/106 |
| 6,869,260 B1 | * | 3/2005 | Mason | B64D 11/0696 410/23 |
| 6,969,219 B2 | * | 11/2005 | Speece | B60P 7/0807 410/106 |
| 7,055,783 B2 | * | 6/2006 | Rosemann | B60R 16/0215 24/297 |
| 7,134,819 B2 | * | 11/2006 | Bullock | B60P 7/0807 410/112 |
| 7,481,610 B1 | * | 1/2009 | Egigian | B60P 7/0807 410/106 |
| 7,503,528 B2 | * | 3/2009 | Adams | F16L 3/137 24/297 |
| 7,762,507 B2 | * | 7/2010 | Del Pino | A47G 1/20 248/231.91 |
| 8,028,962 B2 | * | 10/2011 | Geiger | F16L 3/2332 248/65 |
| 8,579,240 B2 | * | 11/2013 | Germ | H02G 3/263 248/62 |
| 8,839,591 B2 | * | 9/2014 | Guthrie | E04G 21/3276 248/231.91 |
| 9,163,651 B2 | * | 10/2015 | Ostrobrod | F16B 13/08 |
| 9,511,544 B2 | * | 12/2016 | Hemingway | H02G 3/32 |
| 9,580,114 B2 | * | 2/2017 | Allen | F16B 21/086 |
| 10,478,645 B2 | * | 11/2019 | Maurice | A63B 29/024 |
| 10,688,943 B2 | * | 6/2020 | Bachelder | B60R 13/0206 |
| 10,737,126 B1 | * | 8/2020 | Aleksovski | E04G 21/328 |
| 11,060,544 B2 | * | 7/2021 | Kawaguchi | F16B 5/0685 |
| 11,225,201 B2 | * | 1/2022 | Moulin | B60R 11/00 |
| 11,319,127 B2 | * | 5/2022 | Beyer | B65D 63/18 |
| 11,414,005 B2 | * | 8/2022 | Egigian | B60P 7/0807 |
| 11,446,526 B2 | * | 9/2022 | Guthrie | F16B 13/0891 |
| 2008/0035801 A1 | * | 2/2008 | Adams | F16B 5/0685 248/73 |
| 2017/0138379 A1 | * | 5/2017 | Iwahara | B60R 16/0215 |
| 2022/0362614 A1 | * | 11/2022 | Bugeaud | F16B 21/02 |
| 2022/0412039 A1 | * | 12/2022 | Reardon | E02D 29/1427 |

FOREIGN PATENT DOCUMENTS

| | | | | |
|---|---|---|---|---|
| DE | 202017105284 U1 | * | 10/2017 | |
| DE | 102019218899 A1 | * | 6/2020 | B60R 11/00 |
| FR | 602284 A | * | 3/1926 | |
| GB | 2163509 | | 2/1986 | |
| GB | 2564883 | | 1/2019 | |
| KR | 20090105848 A | * | 10/2009 | |
| KR | 101020100 B1 | * | 3/2011 | |
| WO | 2005075871 | | 8/2005 | |
| WO | WO-2012156562 A1 | * | 11/2012 | B66C 1/666 |
| WO | WO-2018185149 A1 | * | 10/2018 | B60P 7/0807 |

* cited by examiner

ANCHOR POINT

TECHNICAL FIELD

The present invention relates to an anchor point, more specifically a component or an arrangement of components for introducing force into a planar lightweight wall element. Furthermore, a corresponding method for assembly is described.

BACKGROUND

In the air travel industry, the most lightweight construction materials possible are used as wall coverings for passenger cabins. A basic material which has been used for a long time are sandwich plates. A core (stalk core, honeycomb core, foam core, etc.) is connected in a secure and planar manner to an upper and lower thin covering layer. Materials such as metal (aluminum sheet), plastics material (GRP, CFRP, thermoplastics, etc.) or plasticized paper are often used as covering layers. Honeycombs or tubes of paper, aluminum or plastics materials and plastics material foams are often used as a core. The core material generally cannot be locally loaded or only to a small degree, for which reason anchoring elements, such as screws, nails or dowels can provide only little retention.

PRIOR ART

Sandwich plates perform a supporting and decorative function, act in a sound-absorbing and insulating manner. However, a disadvantage is that the lightweight construction thereof makes fixing to the aircraft fuselage and the anchoring of additional fixtures very complex. Traditionally, therefore, fixing means are adhesively-bonded in a planar manner to such sandwich plates or screwed with washers over both covering layers since an introduction of force into the sandwich plate can thus be ensured. Alternatively, blind holes are introduced by means of a covering layer into the core and an anchor point is produced by a retention element with a quantity of adhesive being anchored completely in the volume of a honeycomb structure (undercut anchoring). It is obvious that this may mean a significant increase in weight locally. An anchoring which has been set in this manner can also hardly be removed again.

An anchor point in the context of this application is intended to be understood to refer to a component which enables the introduction of force into a sandwich plate or which, as shown below, can be fitted in a thin plate in a secure and simple manner without the above-described complexity of products of the prior art.

SUMMARY

In principle, an anchor point for a securing element comprises a substantially planar anchor plate 12 and a resilient element 14 (14') which is connected thereto and which in turn has at least two locking tongues 16 and 17. The anchor plate 12 is configured to be introduced into a blind hole or a through-hole and preferably in such a manner that an edge of the anchor plate can be positioned on the surface 23 of the covering layer or plate where the introduction of force is intended to be carried out. The diameter of the anchor plate thus substantially corresponds to the hole plus a support edge. The term "anchor plate" already implies that it is intended to act as a connection location for a securing element 30.

It is therefore preferable for the anchor plate to have a substantially circular disk shape with an upper side and a lower side, wherein the lower side has a planar edge support 13 which may be formed as a (circular ring-like) step which brings about a centering action during assembly.

There is located on the anchor plate the resilient element 14 which is preferably constructed as a plastics material loop in the form of an omega and which applies the resilient action primarily in a direction perpendicular to the plane of the anchor plate. In this instance, the legs of the omega are orientated toward the anchor plate, the upper rounded portion of the omega thus faces away from the anchor plate 12. The resilient element may naturally also be constructed differently from the manner described here or illustrated in the Figures. Functionally equivalent variants are therefore included.

In accordance with the installation logic in which the fitter is located in front of the wall, the resilient element is thus fitted to the lower side of the anchor plate and is thereby recessed in the bore hole. In a preferred variant, the resilient element 14 is at the outer side thereof in the portion remote from the anchor plate constructed in a planar manner or provides an abutment face 15. This abutment face serves in the finally assembled state as a contact face for the securing element 30.

Preferably, the anchor plate will have at least 2 through-openings 26, 27. These openings are used to insert the securing element through in a loop.

Locking tongues 16, 17 are provided as a third central element of an anchor point. They extend from a common connection region 20 with the resilient element 14 substantially diametrically away from each other. The connection piece is in a preferred embodiment located in the upper region (upper rounded portion). The locking tongues are, as implied by the name, constructed as resilient elements, wherein a first end is joined to the connection piece 20 and the other end 21 or 22 is in the form of a free or open end and is configured to be hooked to surrounding structures and consequently to bring about a retention effect. The locking tongues may in the non-installed state be configured as linear or slightly curved components with an oval or rectangular cross section. The length thereof should be selected in such a manner that they have to be resiliently compressed for introduction into the hole. It is thereby possible, particularly with sandwich plates, for the locking tongues after overcoming the resistance at the edge of the hole of the covering layer to expand in the softer core region and consequently for the spacing of the ends 21, 22 to be larger than the hole diameter. The locking tongues undercut the hole opening. Based on this functionality set out, it is clear that the ends 21, 22 of the locking tongues 16, 17 can be configured in such a manner that they can perform the described functionality. Depending on the core, the ends may be produced to be expanded in a blade-like manner or pointed. In place of separate locking tongues, a shield-shaped spherical shell could also be selected whose edge forms as a whole a support at the rear side of the covering layer. Thus, an embodiment of an anchor point could also be produced on a thin plate alone.

Furthermore, each locking tongue has an upper side and a lower side, wherein the upper side faces the anchor plate and provides a guiding face 19. The function of the guiding face 19 and its cooperation with the abutment face 15 is explained in greater detail below.

The connection region 20 is formed from one or more webs or wall portions which connect the locking tongues 16, 17 and the resilient element 14 in such a manner that the guiding face 19 and the abutment face 15 are at least partially arranged opposite and spaced apart from each other and form a channel 25 between them. This channel is involved in the guiding or looping the securing element through as a loop and it is, following the curvature of the upper portion of the omega-like resilient element, preferably rounded. As already indicated, a looping of the securing element through the anchor plate is intended to be possible, for which reason sharp edges and narrow curves are less preferable.

It has been found that the anchor point with the resilient element and locking tongues can be produced in one piece from plastics material and is preferably produced by means of injection-molding. Alternatively, an assembly of individual elements in the material mix could be carried out.

In order to achieve the functionality as a securing location, an arrangement comprising an anchor point and a securing element is intended to be considered below. In this instance, a securing element is intended primarily to be understood to be a flexible, semi-rigid resilient strip. The term "semi-rigid resilient" is preferably intended to be understood to mean that the strip has a degree of inherent rigidity, but can be curved in a reversible manner. This is useful when the securing element is introduced through the first through-opening 26 at the upper side 23 of the anchor plate 12, afterwards guided along the guiding face 19 in the channel 25 and redirected and leaves through the second through-opening 27 at the upper side 23 again. In this instance, the selected length of the securing element enables an adaptation to the object which is intended to be secured.

In a particularly preferred manner, a cable tie is used as a securing element 30. A binding wire or all other strip-like elements which can be combined with the described operating principle of the connection location would also be conceivable. A cable tie is extremely suitable as a known and reliable securing element having an engaging and adjustable closure in order to cooperate with a connection location. The design which is determined by the configuration of the resilient element and locking tongues enables, depending on requirements, longer or shorter cable ties to be used. In principle, a cable tie as a component of an arrangement can also be cut open again, removed and replaced with a new one of a different length. Even if no replacement were to be provided, the anchor plate with the resilient element and locking tongues can remain as a cover in the bore hole.

In a conceivable variation, a cable tie could also be produced in an integral manner with the anchor point; in a state connected in the region of the upper rounded portion. Since cable ties can be cut to length after closure, many applications would be covered with an arrangement which is produced in an integral manner (for example, from plastics material).

An assembly method which describes the use of an anchor point or an arrangement according to the invention will now be described below.

A method for securing an anchor point in principle comprises the following steps:
a) providing an opening of sufficient depth in a surface and providing an anchor point. The size of the hole correlates in this instance as described above;
b) pressing the anchor point through the opening until the locking tongues abut behind the opening or, in the case of a covering layer of a sandwich panel, expand in the core;
c) introducing a securing element in the form of a resilient semi-rigid strip with an end in a first through-hole 26 at the upper side of the anchor plate;
d) until the end of the securing element at the upper side of the anchor plate leaves again at the second opening;
e) placing an object which is intended to be secured against the anchor plate in the region between the two ends of the securing element;
f) applying a tensile force to both ends of the securing element counter to the resistance of the resilient element;
g) connecting the two ends of the securing element (30) in such a manner that the object to be secured is pressed on by the resilient force of the resilient element (14).

In this context, the dual function of the resilient element 14 becomes clear. As a result of the closure of the securing element/cable tie and/or the pulling at the ends, the resilient element is squeezed or compressed and thus ensures a secure retention of the object which is intended to be secured since the securing element presses the object against the upper side of the anchor plate. At the same time, as a result of the compression of the spring, the connection region 20 is moved closer to the lower side of the anchor plate, which leads to an expansion of the locking tongues 16, 17 and also improves the anchoring thereof.

The method described in this manner can be supported by intermediate steps such as orientation, position verification or other safety measures. Thus, the edge support 13 may, for example, be supplemented by an adhesive layer, which improves the fixing of the anchor plate to the bore hole edge.

Alternatively, some steps of this sequence can also be interchanged, for example, as a sequence a), c), d), b). Whether the cable tie is introduced first into the anchor plate and the arrangement is introduced into the bore hole afterwards or the cable tie is first looped in when the anchor plate has been placed is dependent on the application and can be carried out by the fitter depending on requirements.

Particularly when the anchor point or the arrangement comprising the anchor point and securing element is used as a cable retention, it may be necessary to produce intersections of cable bundles. To this end, it may be advantageous to use a spacer element which can be inserted into the arrangement. In order to carry this out, the step e) can be carried out as the steps e1) and e2):
e1) fitting a tower element 40 to the anchor plate 12 in such a manner that the centering components 41, 42 thereof engage or latch in a positive-locking manner at the first longitudinal end in complementary structures of the anchor plate;
e2) placing an object which is intended to be secured in the receiving region 47 at the second longitudinal end of the tower element 40.

The term "centering component" in this instance is intended to be understood to be a surface feature of the tower element which has been configured in such a manner that it engages on the surface of the anchor plate in a positive-locking manner or engages therein and applies a centering action of the anchor plate and tower element, in other words it enables a desired position to be produced. A centering component may thus be configured as one or more protruding pin(s), ribs, an undulating structure.

This variant may also be handled differently in the sequence:
a), c), d), e1), b), e2), f), g) or a), e1), c), d), b), e2), f), g).

As an additional safety measure, after step g) an adhesive or filler may be injected through an additional or an existing opening in the anchor plate 12 into the opening behind the anchor plate (12). This can be carried out using an appropriately equipped adhesive gun or a commercially available injection needle. It is advantageous in this instance for an undercut anchoring to be produced, wherein—depending on the quantity of material injected—the locking tongues are bonded in the core or to the rear side of the covering layer or the cable tie is connected to the resilient element. It is also possible to use as fillers expanding foams which fill the intermediate space between the anchor plate and bore hole wall or which penetrate into the cells of the core.

If, in the region of the resilient element, for example, at locations where the spring remains only in the compressed state, a deposit of adhesive (capsule) is placed in a protected manner, the arrangement can be configured in such a manner that, as a result of the final closure process, with the compression of the resilient element, the capsule is burst and the adhesive/filler is distributed without further assistance in situ.

BRIEF DESCRIPTION OF THE DRAWINGS

The invention will now be explained with reference to the appended drawings, by way of example, with reference to particularly preferred embodiments.

DETAILED DESCRIPTION

Figure 1:
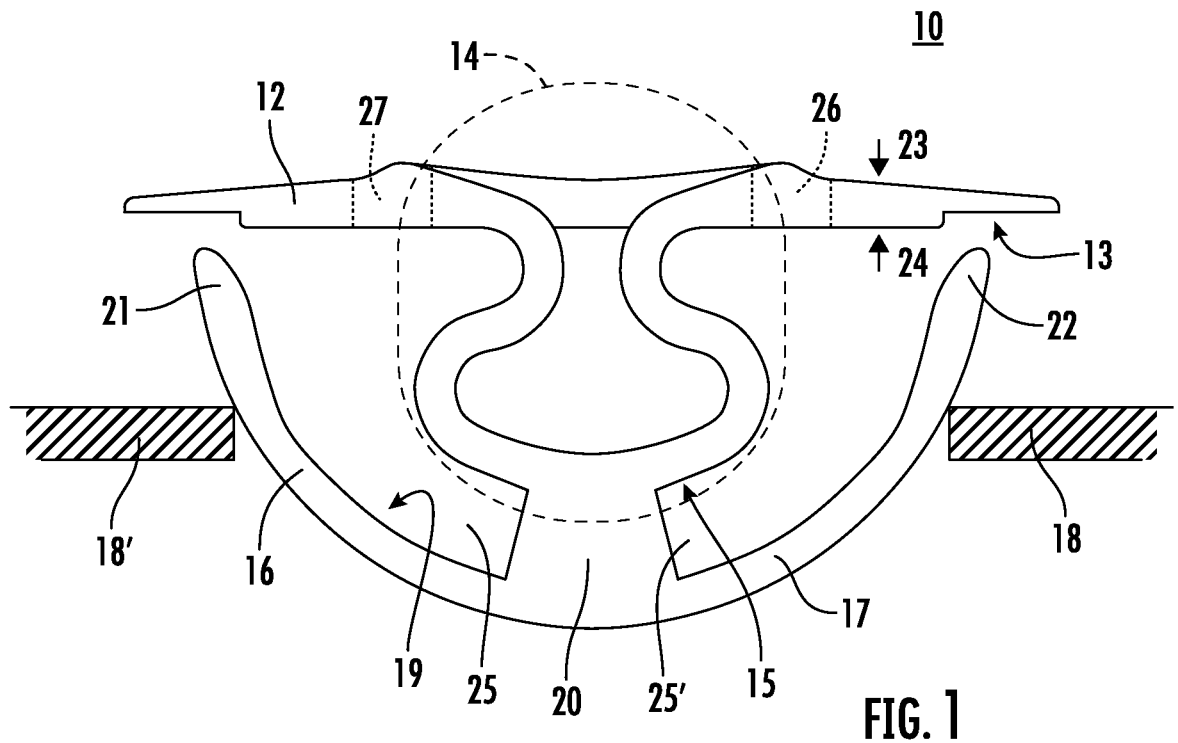
FIGS. 1 and 2 show a central through a connection location in different assembly states.
Figure 2:
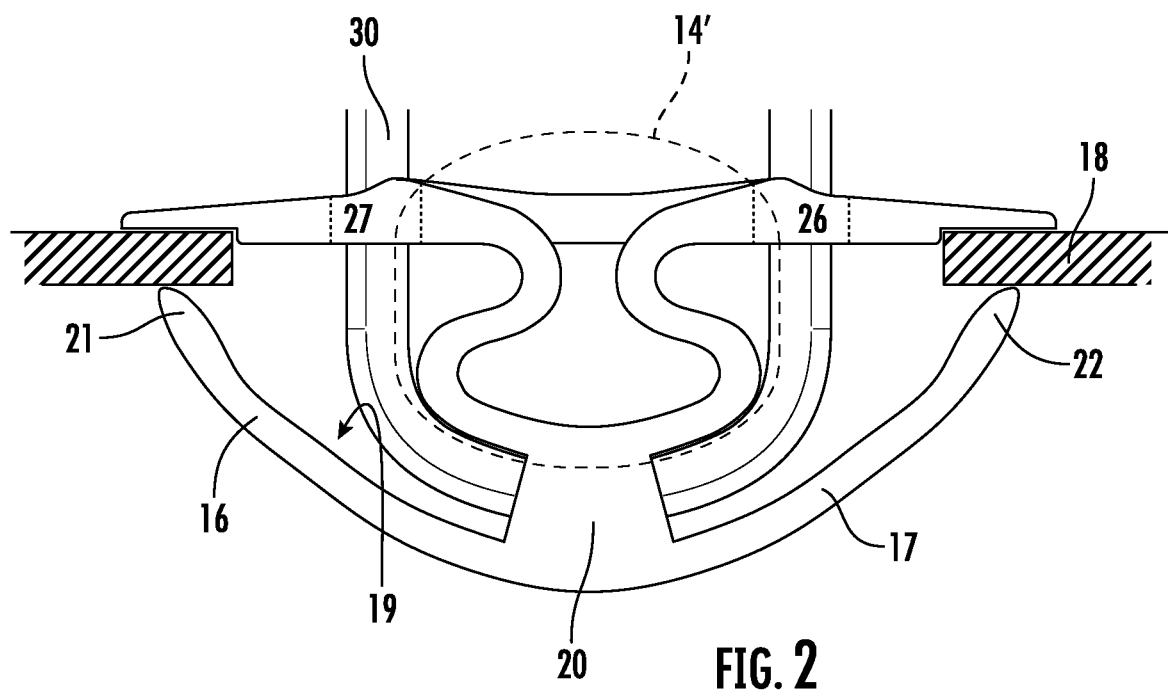

FIGS. 1 and 2 show a cross section of the assembly situation of an anchor point 10 in a thin plate or surface 18 or 18'. The anchor plate 12 has a width or a diameter which is greater than the hole/recess/opening in the surface 18. At the edge, there is provided a graduated edge support 13 whose step is selected in such a manner that it centers the anchor plate in the hole/opening. The upper side or the lower side is indicated with short arrows 23, 24. The features 26 and 27 refer to passage-openings or though-openings through the anchor plate, in the case shown in a state configured for use of a cable tie as an exemplary securing element 30.

The two locking tongues 16 and 17 are connected to the resilient element by means of the connection region 20. They extend—in the Figures—to the right and left. FIG. 1 shows that the locking tongues when introduced into the opening in the surface 18 strike the edge and when further pressure is applied to the anchor plate 12 are deflected inward. After passing the covering layer, the locking tongues 16, 17 can return to the original position again. Depending on the selected resilience of the locking tongues 16, 17 and the structural type thereof, the locking tongues may also perform the function of a loss-prevention means.

In the preferred embodiment of FIGS. 1 and 2 shown, the resilient element 14 has the described omega shape, indicated by the dashed circle. A comparison between FIGS. 1 and 2 shows that in FIG. 2 the resilient element is compressed, which leads to a pressing operation for the locking tongues against the covering layer. The ends 21, 22 of the locking tongues are illustrated here in simplified form. The region between the locking tongues and the upper side of the omega-shaped resilient element 14, 14' forms the channel 25 or 25' which are already filled in FIG. 2 with a cable tie which contacts the abutment face 15 and compresses the spring.

FIG. 1 shows that a cable tie which is introduced, for example, through the opening 27 of the upper side 23 of the anchor plate 12 strikes the guiding face 19 and is deflected along it. In the channel 25, the securing element 30 is guided and can afterwards leave through the opening 26 again. This situation is shown in FIG. 2, where by tightening the cable tie the contact with the guiding face 19 is no longer present. The tensile force on the cable tie is transmitted via the support face 15 to the resilient element 14 (14').

Figure 3:
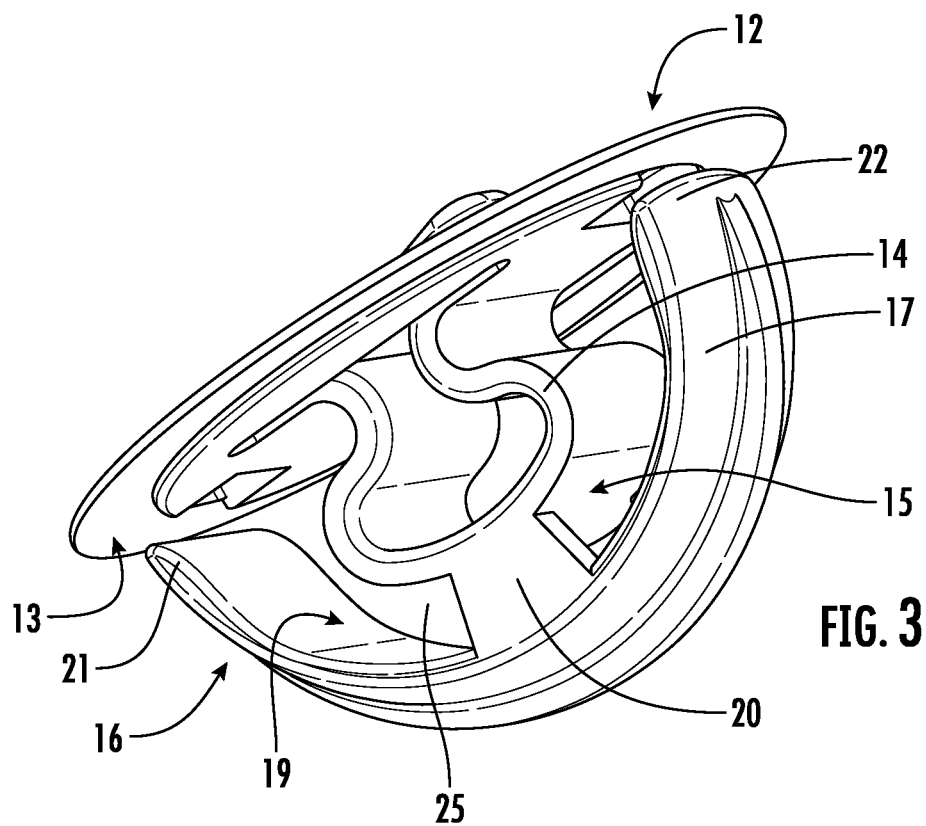
FIG. 3 shows an oblique 3D view of a connection location.

FIG. 3 shows an oblique 3D view of a connection location without any cable tie. It can be seen how the connection element 20 as a result of the arrangement thereof at the side leaves the channel 25 free in order to enable a redirection of the securing element.

Figure 4:
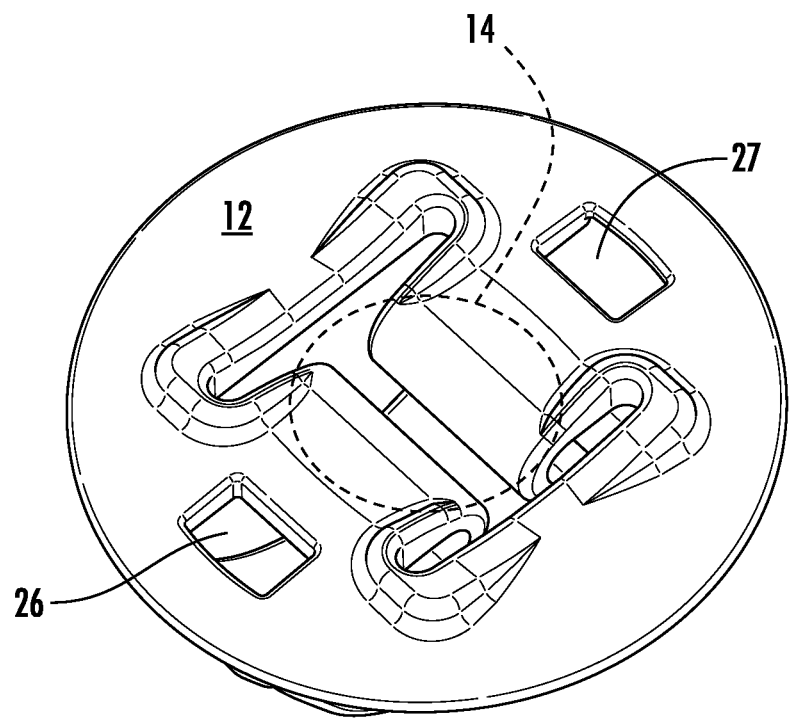
FIG. 4 shows a plan view of the upper side of an anchoring plate.

FIG. 4 shows a plan view of a variant of an anchor plate 12. The through-openings 26, 27 are shown from the upper side 23. The resilient element merges, as shown, into an annular configuration of the anchor plate. The contours shown serve, on the one hand, to center an object which is intended to be retained or, alternatively, to center a tower element (FIG. 6).

Figure 5:
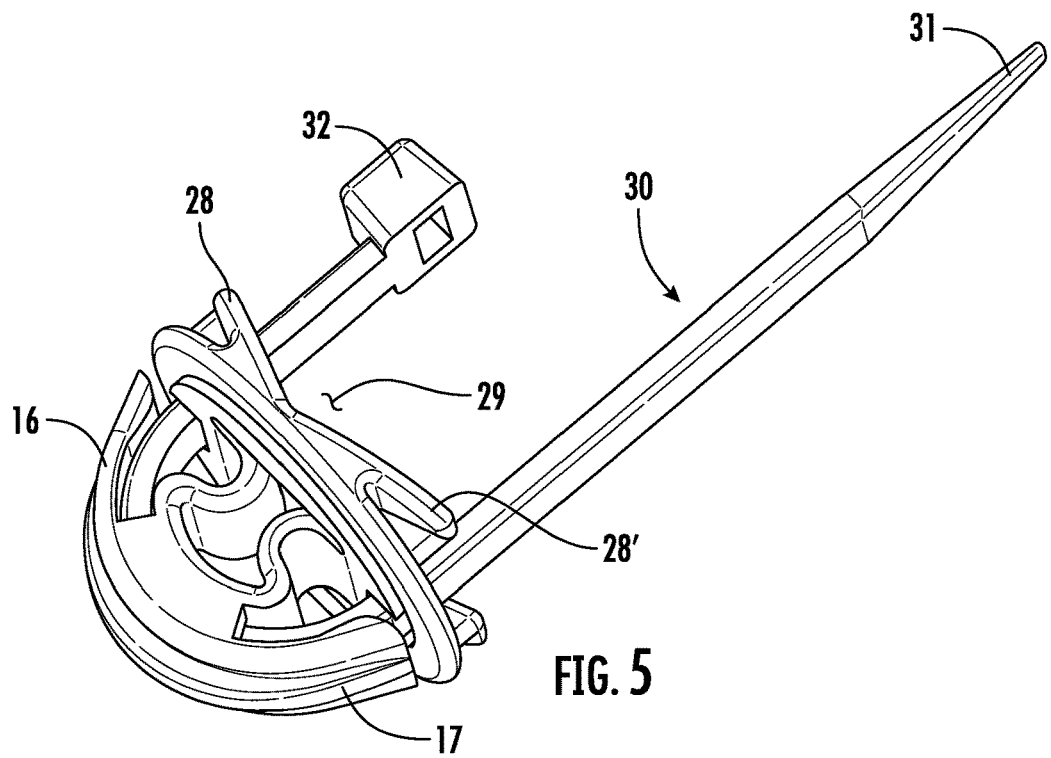
FIG. 5 shows a 3D view of an arrangement comprising the anchoring location and securing element.

FIG. 5 shows a variant of an anchor point 10 with two channel faces 28, 28' which are positioned obliquely with respect to each other and which between them form a receiving region 29. There is also shown a cable tie 30 with the known ends 31, 32 thereof, in this instance as an open end with a tapered point and as a locking element for closure.

Figure 6:
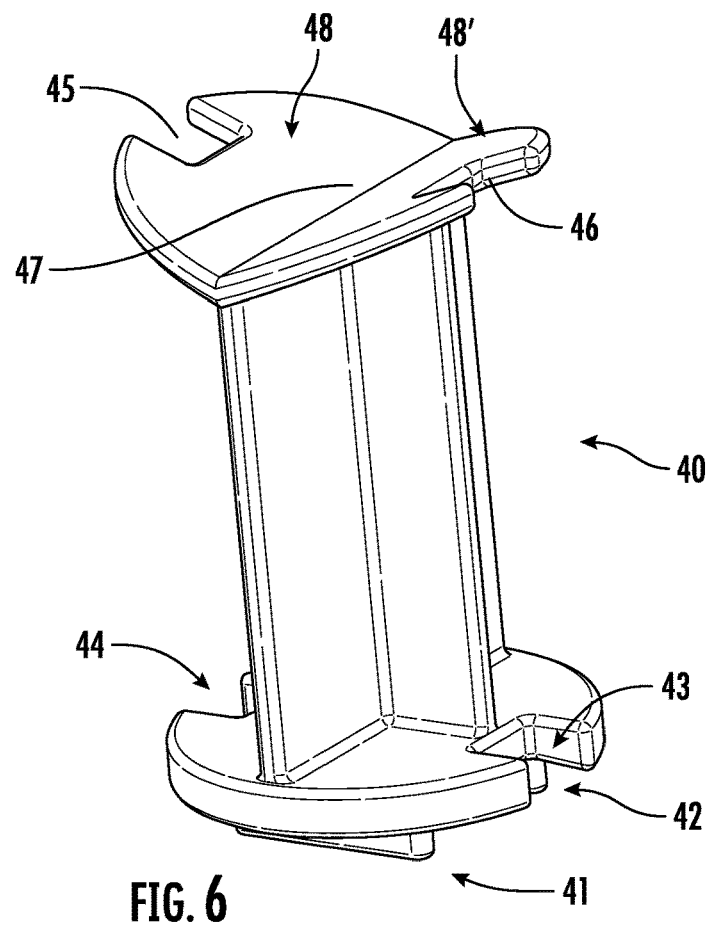
FIG. 6 shows a tower element.

FIG. 6 in turn shows a possible tower element or spacer piece 40. The first (in this instance, lower) end thereof has centering elements 41, 42 which can engage in the slots laterally with respect to the resilient element 14 of FIG. 4. The central shaft element is in this instance shown with a cross-like cross section, but it may also be configured as a pipe structure. At the upper end, in a similar manner to the channel faces 28, 28' on FIG. 5, there is a receiving region 47 with two tilted abutment faces 48, 48'. The recesses 43-46 serve to guide and center the cable tie.

The features of the invention disclosed in the above description, in the drawings and in the claims may be significant for the implementation of the invention both individually and in any technically favorable or advantageous combination.

The invention claimed is:

1. An anchor point for a securing element, the anchor point comprising:
    a substantially planar anchor plate and a resilient element which is connected thereto and includes at least two locking tongues;
    the locking tongues extend from a common connection region with the resilient element, diametrically away from each other, and each terminate in an open end;
    each said locking tongue has an upper side and a lower side, and the upper side faces the anchor plate and provides a guiding face;
    the resilient element provides an abutment face; and
    wherein the connection region is formed from one or more webs or wall portions which connect the locking tongues and the resilient element such that the guiding face and the abutment face of the resilient element are at least partially arranged opposite and spaced apart from each other and form a channel therebetween, the channel extending between first and second through-openings in the anchor plate.

2. The anchor point as claimed in claim 1, wherein the anchor plate has a substantially circular disk shape with an upper side and a lower side, and the lower side has a planar edge support.

3. The anchor point as claimed in claim 2, wherein the edge support is constructed as a step.

4. The anchor point as claimed in claim 1, wherein the resilient element is constructed as a plastics material loop formed with an omega shape and applies a resilient action primarily in a direction perpendicular to a plane of the anchor plate.

5. The anchor point as claimed in claim 1, wherein the anchor plate has at least two through-openings.

6. The anchor point as claimed in claim 1, wherein the anchor point with the resilient element and the locking tongues are formed in one piece from plastic material.

7. An arrangement comprising the anchor point as claimed in claim 1 and a securing element, wherein the securing element comprises a flexible, semi-rigid resilient strip which, in a state introduced through the first through-opening at an upper side of the anchor plate, is redirected along the guiding face in the channel and leaves through the second through-opening at the upper side.

8. The arrangement as claimed in claim 7, wherein the securing element comprises a cable tie.

9. A method for securing the anchor point as claimed in claim 1, comprising the following steps:
   a) providing an opening of sufficient depth in a surface and providing the anchor point;
   b) pressing the anchor point through the opening until the locking tongues abut behind the opening or, in the case of a covering layer of a sandwich panel, expand in a core thereof;
   c) providing a securing element comprising a resilient semi-rigid strip with having two ends and introducing a first one of the ends in the first through-opening at an upper side of the anchor plate;
   d) inserting the securing element until the first one of the ends leaves at the upper side of the anchor plate at the second through-opening;
   e) placing an object which is intended to be secured against the anchor plate in a region between the two ends of the securing element;
   f) applying a tensile force to both of the ends of the securing element counter to a resistance of the resilient element; and
   g) connecting the two ends of the securing element such that the object to be secured is pressed on by a resilient force of the resilient element.

10. The method as claimed in claim 9, wherein the steps a) to d) are carried out in a sequence a), c), d), b).

11. A method for securing the anchor point as claimed in claim 1, comprising the following steps:
   a) providing an opening of sufficient depth in a surface and providing the anchor point;
   b) pressing the anchor point through the opening until the locking tongues abut behind the opening or, in the case of a covering layer of a sandwich panel, expand in a core thereof;
   c) providing a securing element comprising a resilient semi-rigid strip with having two ends and introducing a first one of the ends in the first through-opening at an upper side of the anchor plate;
   d) inserting the securing element until the first one of the ends leaves at the upper side of the anchor plate at the second through-opening;
   e1) fitting a tower element to the anchor plate such that centering components thereof engage or latch in a positive-locking manner at a first longitudinal end in complementary structures of the anchor plate,
   e2) placing an object which is intended to be secured in a receiving region at a second longitudinal end of the tower element;
   f) applying a tensile force to both of the ends of the securing element counter to a resistance of the resilient element; and
   g) connecting the two ends of the securing element such that the object to be secured is pressed on by a resilient force of the resilient element.

12. The method as claimed in claim 11, wherein a sequence of the steps is carried out as follows:
   a), c), d), e1), b), e2), f), g), or a), e1), c), d), b), e2), f), g).

13. The method as claimed in claim 11, further comprising after step g), injecting an adhesive or filler through an additional or an existing opening in the anchor plate into the opening behind the anchor plate.

14. The method as claimed in claim 11, wherein, as a result of step f), a storage capsule which has been fitted in an active region of the resilient element with adhesive or filler therein is activated and contents thereof are released into the opening.

* * * * *